Patented Nov. 26, 1940

2,222,967

UNITED STATES PATENT OFFICE 2,222,967

PREPARATION OF SYNTHETIC RUBBERLIKE MATERIALS

Heinz Wollthan and Wilhelm Becker, Cologne, Rhine, Germany, assignors, by mesne assignments, to Jasco, Incorporated, a corporation of Louisiana No Drawing. Application November 5, 1938, Serial No. 239,018. In Germany November 11, 1937

4 Claims. (Cl. 260—32)

The present invention relates to the preparation of synthetic rubber-like materials.

It is known that the polymerization of butadienes-1.3 is easily performed in an aqueous emulsion. As emulsifying agents there are usually employed alkali metal salts of higher fatty acids or of alkylated naphthalene sulfonic acids. Depending on the nature of the emulsifying agent the polymerization is effected either in alkaline or in acid medium. It is known that the polymerizates which are obtainable in this manner, suffer from the disadvantage of having an insufficient plasticity. Therefore, these products are usually subjected to a plastifying process prior to working the same on the roller as is described, for instance, in application Serial No. 196,903 to Albert Koch et al. filed March 19, 1938.

We have now found that the emulsion polymerization of butadienes-1.3 easily results in the formation of products of a good plasticity by employing as emulsifying agents water-soluble products of the interaction of compounds containing an ethylene oxide linkage, upon a water insoluble organic hydroxy compound containing a higher aliphatic radical, and working at a pH-value of below 7, i. e. in an acid medium. The polymerizates which are obtainable in this manner are distinguished by a better workability than those obtainable under the same conditions with the aid of the prior known emulsifying agents.

Another feature of our present invention lies in the influence which is exerted by the new emulsifying agents upon regulators of the type described in application Serial No. 193,060 to Kurt Meisenburg et al. filed Feb. 28, 1938. These regulators which are defined therein as organic sulfur containing compounds which are soluble in the compounds to be polymerized, for instance diisopropylxanthogen disulfide, serve to prevent the formation of insoluble products. On the other hand, the use of these regulators may be accompanied by a loss in elasticity of the vulcanized products. We have now found that the simultaneous use of our new emulsifying agents and of the regulators of the type described results in the formation of products which combine a good plasticity in the unvulcanized state with excellent mechanical properties such as elasticity, tensile strength, hardness, etc. in the vulcanized state.

As a matter of fact, our new emulsifying agents can be employed also in connection with other auxiliary agents such as hydrogen peroxide, benzoyl peroxide, per-salts and the like.

The term "butadienes-1.3" comprises butadiene itself as well as its substitution products such as isoprene or 2-chlorobutadiene. Finally, the butadienes can be employed in admixture with other polymerizable compounds such as styrene, acrylic acid nitrile or fumaric acid esters. Turning now to the new emulsifying agents in detail, we start either from aliphatic alcohols or from alkylated phenols which, due to the length of the aliphatic chain, are insoluble in water, and cause these products to react with, for instance ethylene oxide, propylene oxide or glycide. The latter reagents must be employed in such an amount as to impart solubility in water to the reaction product. The required pH-value can be reached by the addition of free acids such as acetic acid, sulfuric acid or hydrochloric acid or by the addition of acid reacting salts.

The following examples illustrate the present invention without, however, restricting it thereto, the parts being by weight:

Example 1

20 parts of the condensation product of 1 mol of oleyl alcohol and 20 mols of ethylene oxide are dissolved in 200 parts of water and, after the addition of 0.15 parts of ammonium persulfate and 3.5 parts of n-acetic acid emulsified with 75 parts of butadiene and 25 parts of styrene. The emulsion thus prepared is shaken for 6 days at 30°, 80 parts of a polymerizate being thus obtained which combines excellent plastic properties with a high resiliency of the vulcanizates prepared therefrom.

Example 2

20 parts of the emulsifying agent according to Example 1 are dissolved in 150 parts of water. After the addition of 0.2 part of potassium persulfate and 4 parts of n-sulfuric acid the same quantity of butadiene and styrene is added and polymerized as described above. 84 parts of a polymerizate are thus obtained which is distinguished by good mechanical properties and an excellent workability.

Example 3

0.5 part of diisopropylxanthogen disulfide are added to an emulsion consisting of 75 parts of butadiene, 25 parts of styrene, 0.15 part of ammonium persulfate, 2.5 parts of concentrated sulfuric acid, 150 parts of water and 18 parts of the condensation product of 20 mols of ethylene oxide per 1 mol of oleyl alcohol. On emulsifying and shaking for 6 days at 30° 86 parts of a mixed polymerizate are obtained which shows a still improved plasticity when compared with the product of Examples 1 and 2, the mechanical properties being by no means impaired.

When employing 30 parts of n-hydrochloric acid instead of 2.5 parts of sulfuric acid a similar result is obtained. The same applies to a process wherein the emulsifying agent is replaced by a product of the condensation of 1 mol. of oleyl alcohol and 10 mols of glycide.

*Example 4*

20 parts of the condensation product of 1 mol of isooctyl alcohol and 10 mols of ethylene oxide are dissolved in 150 parts of water and after the addition of 0.38 part of potassium persulfate and 1 part of concentrated sulfuric acid, emulsified with 75 parts of butadiene and 25 parts of styrene. The emulsion thus prepared is shaken for 6 days at 30°, 75 parts of a polymerizate of excellent mechanical properties and a high plasticity being thus obtained.

*Example 5*

20 parts of the condensation product of 1 mol of isooctyl phenol and 20 mols of ethylene oxide are dissolved in 150 parts of water and, after the addition of 0.38 part of potassium persulfate and 1 part of concentrated sulfuric acid emulsified with 75 parts of butadiene and 25 parts of styrene. The emulsion thus prepared is shaken for 6 days at 30°, 80 parts of a polymerizate of an excellent workability and a high resiliency being obtained.

We claim:

1. The process which comprises causing substances selected from the group consisting of butadienes-1.3 and admixtures thereof with copolymerizable compounds to polymerize in an aqueous emulsion while employing as emulsifying agents water soluble products of the interaction of compounds containing an ethylene oxide linkage with water insoluble organic hydroxy compounds containing a higher aliphatic radical and working at a pH-value of below 7.

2. The process as claimed in claim 1, wherein the reaction is performed in the presence of sulfur containing compounds which are soluble in the substances to be polymerized.

3. The process as claimed in claim 1 wherein the reaction is performed in the presence of diisopropylxanthogendisulfide.

4. The process which comprises causing a butadiene-1.3 in admixture with copolymerizable compound to polymerize in an aqueous emulsion while employing as emulsifying agents water soluble products of the interaction of compounds containing an ethylene oxide linkage with water insoluble organic hydroxy compounds containing a higher aliphatic radical and working at a pH-value of below 7.

HEINZ WOLLTHAN.
WILHELM BECKER.